US011488259B2

(12) United States Patent
Venugopal

(10) Patent No.: US 11,488,259 B2
(45) Date of Patent: Nov. 1, 2022

(54) SYSTEM AND METHOD FOR IMPLEMENTING AN INTERNATIONAL DEMAND DEPOSIT ACCOUNT BRANCH MIGRATION TOOL

(71) Applicant: JPMorgan Chase Bank, N.A., New York, NY (US)

(72) Inventor: Sai Prasanna Venugopal, Singapore (SG)

(73) Assignee: JPMORGAN CHASE BANK, N.A., New York, NY (US)

(*) Notice: Subject to any disclaimer, the term of this patent is extended or adjusted under 35 U.S.C. 154(b) by 100 days.

(21) Appl. No.: 17/070,240

(22) Filed: Oct. 14, 2020

(65) Prior Publication Data
US 2021/0110485 A1 Apr. 15, 2021

Related U.S. Application Data

(60) Provisional application No. 62/914,593, filed on Oct. 14, 2019.

(51) Int. Cl.
G06Q 40/00 (2012.01)
G06Q 30/00 (2012.01)
G06Q 10/10 (2012.01)
G06F 3/0482 (2013.01)
G06F 16/21 (2019.01)
G06F 16/215 (2019.01)
G06Q 40/02 (2012.01)

(52) U.S. Cl.
CPC ........ G06Q 40/12 (2013.12); G06F 3/0482 (2013.01); G06F 16/214 (2019.01); G06F 16/215 (2019.01); G06Q 10/107 (2013.01); G06Q 30/01 (2013.01); G06Q 40/02 (2013.01)

(58) Field of Classification Search
CPC ...... G06Q 40/12; G06Q 10/107; G06Q 30/01; G06Q 40/02; G06F 3/0482; G06F 16/214; G06F 16/215
USPC .......................................................... 705/30
See application file for complete search history.

(56) References Cited

U.S. PATENT DOCUMENTS

| | | | | |
|---|---|---|---|---|
| 9,495,433 | B2* | 11/2016 | Smith | G06F 16/214 |
| 2006/0218405 | A1* | 9/2006 | Ama | G06F 16/214 713/181 |
| 2011/0179176 | A1* | 7/2011 | Ravichandran | G06Q 30/0243 709/226 |
| 2016/0070725 | A1* | 3/2016 | Marrelli | G06F 16/24578 707/692 |
| 2019/0123972 | A1* | 4/2019 | Parandehgheibi | H04L 41/5025 |

OTHER PUBLICATIONS

Notification of Transmittal of the International Search Report and The Written Opinion of the International Searching Authority dated Jan. 27, 2021 in PCT/US20/55466.

* cited by examiner

Primary Examiner — Garcia Ade
(74) Attorney, Agent, or Firm — Greenblum & Bernstein, P.L.C.

(57) ABSTRACT

An embodiment of the present invention is directed to Branch Migration Tool that migrates accounts in an efficient manner. The Branch Migration Tool enables a user to select and copy key tables within the iDDA Global platform to a local instance. In addition, the Branch Migration Tool is transparent to clients with existing account numbers being retained.

20 Claims, 9 Drawing Sheets

SYSTEM AND METHOD FOR IMPLEMENTING AN INTERNATIONAL DEMAND DEPOSIT ACCOUNT BRANCH MIGRATION TOOL

CROSS REFERENCE TO RELATED APPLICATIONS

The application claims priority to U.S. Provisional Application 62/914,593, filed Oct. 14, 2019, the contents of which are incorporated herein in their entirety.

FIELD OF THE INVENTION

The invention relates generally to a system and method for implementing a demand deposit account branch migration tool.

BACKGROUND OF THE INVENTION

International Demand Deposit Account (iDDA) is an application that maintains and runs a Demand Deposit Account business. This may represent a core cash accounting application for International regions (e.g., 122 branches). An International region may cover Europe Middle East and Africa (EMEA), Western Hemisphere (non-domestic US) and Asia branches. iDDA provides multi-currency, multi-branch application processing batch and real time cash postings to customer accounts, calculates interest and provides reporting to customers and Lines of Business (LOBs) for various account types including Nostros.

Financial institutions and other providers may be subject to regulatory requirements that involve migration of accounts and balances off an iDDA Global Platform onto a Local instance of iDDA onshore. Current technologies require a manual approach of closing accounts and opening new ones with new account numbers, customer identifiers, etc. There are no products or solutions that facilitate the migration of existing accounts and balances from a Global instance to a Local instance.

These and other drawbacks exist.

SUMMARY OF THE INVENTION

According to an embodiment, the invention relates to a system that implements a iDDA branch migration tool. The system comprises: an interactive interface that receives user input via a communication network; and a computer processor coupled to a memory component and the interactive interface and further programmed to perform the steps of: initiating a migration of dictionary, metadata and log files from a global environment to a local branch environment, wherein vocabulary files are copied and database table names are prepared for migration and wherein the log files are updated for dictionary validation; selectively migrating local branch data from the global environment to the local branch environment, wherein redundant global data is cleansed in the local branch environment; cleansing source data in the global environment; and removing local branch data in the global environment.

According to another embodiment, the invention relates to a computer implemented method that implements a iDDA branch migration tool. The method comprises the steps of: initiating a migration of dictionary, metadata and log files from a global environment to a local branch environment, wherein vocabulary files are copied and database table names are prepared for migration and wherein the log files are updated for dictionary validation; selectively migrating local branch data from the global environment to the local branch environment, wherein redundant global data is cleansed in the local branch environment; cleansing source data in the global environment; and removing local branch data in the global environment.

The system may include a specially programmed computer system comprising one or more computer processors, interactive interfaces, electronic storage devices, and networks. The computer implemented system and method described herein provide unique advantages to entities, financial institutions, branch locations, and other users, according to various embodiments of the invention. The Migration Tool of an embodiment of the present invention is directed to providing integrated automated validation with resiliency and operability. The Migration Tool also enables a phased migration process as well as parameterization to specify full copy, definition only or selective copy of the tables involved. An embodiment of the present invention provides a re-useable solution for other upcoming migrations in the future. The Migration Tool facilitates final export/import and provides automated status communications (e.g., emails, messages, etc.) at each configurable step within a migration process. In addition, deployment logs may be automatically shared to configured users for quick validation. The Migration Tool also provides parallel execution to promote multitasking. An embodiment of the present invention leverages solutions developed for various (e.g., current and upcoming) regulatory requirements on shoring directives that involve China, India, etc.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
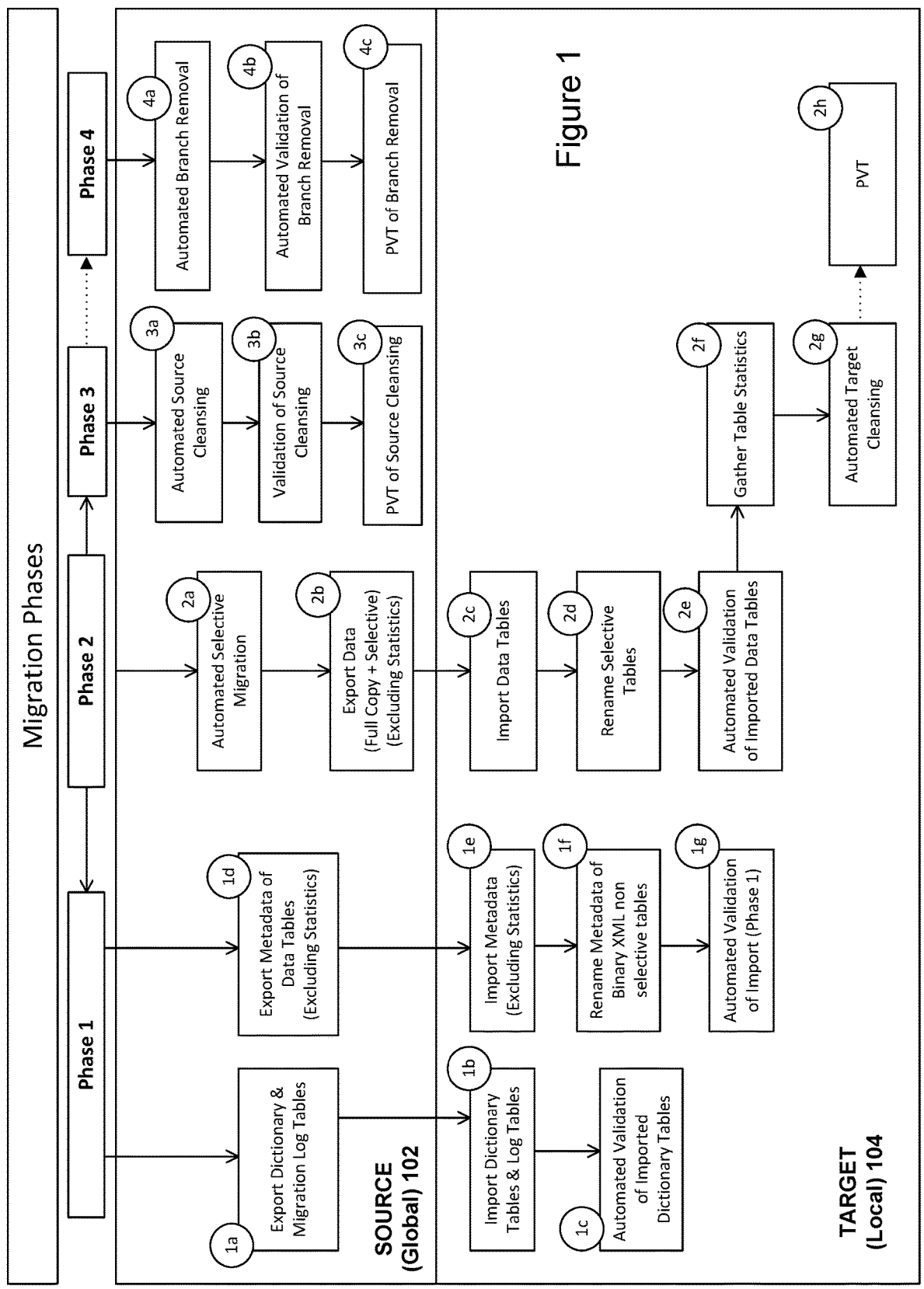
FIG. 1 is a branch migration flow, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Migration Tool that migrates accounts in an efficient and effective manner. The Migration Tool enables a user to select and copy key tables within an iDDA Global platform to a local instance. In addition, the Migration Tool is transparent to clients with existing account numbers being retained.

According to an embodiment of the present invention, the migration process further maintains historic data to support back value dated transactions. The Migration Tool may include validation to ensure account creation is successful and balances have been migrated correctly. An embodiment of the present invention may provide an end-to-end process that is generic and re-usable to migrate any branch at a future date and time. In addition, certain target locations may have different requirements (e.g., regulatory, country specific, etc.) which an embodiment of the present invention may account for during the migration process. With an embodiment of the present invention, data required for a new branch setup may be migrated from Global and then setup as a new branch.

According to an exemplary implementation, the Migration Tool may be developed using Info-Basic, Shell Scripts and PL/SQL (Procedural Language/Structured Query Language). Info-Basic may represent a front-end that provides a menu-driven approach. Shell scripts may act as an interface between the front-end to the back-end PL/SQL. PL/SQL programming may run in a database system performing the migration. Other components, services and variations thereof may be implemented. An exemplary solution may leverage native database administrator (DBA) utilities such as a database self-service portal for a final export/import of tables. The database self-service portal for application development teams provides a self-service web portal for commodity based tasks. Self-service automated tasks reduce user requests for tickets and demand on the infrastructure database teams. In addition, the database self-service portal may provide exporting of dictionary, metadata of dictionary and log files as well as exporting of source data. Various database self-service portals, services and tools may be implemented in accordance with the embodiments of the present invention.

Automated validation steps may be provided at specific phases of execution. For example, automated status communications (e.g., emails, messages, etc.) or other notifications may be issued on completion of key steps within the migration process. Deployment logs may be automatically shared to specified users for validation and audit. In addition, an embodiment of the present invention provides parallel execution to promote multitasking. The Migration Tool may be configured to allow flexibility in approaches to specify full copy, definition only or selective copy of the tables involved. Other subsets may be identified. For improved transparency and ease of validation, an embodiment of the present invention may include a communication feature to send automated emails or notifications with information on executions performed as well as migration logs to the configured users/stakeholders. Other status and relevant information may be provided in various formats.

The Migration Tool may include an automated menu driven interface that displays the steps executed where the migration validation may be integrated and automated. The branch migration tool may further include an interface and/or other GUI front end.

An embodiment of the present invention seeks to reduce and/or eliminate compliance issues. With an embodiment of the present invention, other branch data is not forwarded into a new target environment. For example, in the new target environment, an application server and database server only contains relevant (target environment) details and would therefore be light. In this exemplary implementation, legacy of (target environment) specific history data may be maintained including contents of the application server. In addition, the same account numbers may be maintained. There is little to no risk of back value transactions as the account ladder may be maintained. In this example, the forward transaction queue may happen as business as usual (BAU). With this, there is little to no client impact. Moreover, an embodiment of the present invention may avoid any requirement of a staging environment and requiring a double copy (e.g., global to staging and then staging to target environment).

In an exemplary scenario, there may be approximately 115,000 tables to be migrated from a global environment to a target environment or database. Out of the 11500 tables, there may be 3800 tables that are dictionary tables. For example, each table may have thousands and thousands of rows/columns of data including customer account information, etc. Accordingly, an embodiment of the present invention may perform migration in multiple phases followed by a cleansing phase in the global environment. This would reduce the risk of performing an entire data migration on a single instance and further reduce migration time significantly. With this approach, there would be no deployment performed between two phases of migration (in the source). During migration, input channels may be brought down to prevent any accidental input.

FIG. 1 is a branch migration flow, according to an embodiment of the present invention. According to an embodiment of the present invention, migration data may be provided in phases. As shown in FIG. 1, Phase 1 represents Migration of Dictionary, Metadata and Log Files. Phase 2 represents Migration of Data tables and Target Cleansing. Phase 3 represents Cleansing of data in a Source. Phase 4 represents Branch Removal in the Source. As shown in FIG. 1, Source 102 is represented as Global and Target 104 is represented as the Local. In this example, branch migration is from Source 102 to Target 104.

In Phase 1 of migration, the tool may extract, import and validate various tables and data. This may include Dictionary tables, Migration log tables and Metadata of Data tables to be migrated. As shown in FIG. 1, Source 102 exports dictionary and migration log tables (step 1a). Target 104 may then import Dictionary tables and log tables (step 1b). Target may run automated validation of imported dictionary tables (step 1c). In addition, Source 102 may export metadata of data tables (step 1d). This may exclude certain information such as statistics, for example. Target 104 may then import Metadata (step 1e). Target 104 may rename Metadata of binary XML non-selective tables (step 1f). Target 104 may run automated validation of import of Phase 1 (step 1g).

In Phase 2 of migration, the tool may perform Data tables migration, e.g., export, import and validate. In addition, Data tables relevant to Branch Migration (e.g., local instance) may include: Full Copy—Entire contents of these tables will be copied over to the new instance; Definition Only—Only the Metadata/Table structure needs to be copied to the new instance; and Selective Copy—Only the Branch specific data needs to be copied over. Other variations in selective portions of data and files may be applied.

As shown in FIG. 1, Source 102 may initiated an automated selective migration (step 2a). This may include exporting data, which may include a full copy and/or selective portions (step 2b). Certain information may be included, such as statistics, for example. Target 104 may then import Data Tables (step 2c). This may involve renaming selective tables (step 2d). Target 104 may run an automated validation of imported data tables (step 2e).

As shown in FIG. 1, Phase 2 may include Target Cleansing. Table statistics may be gathered (step 2f). Automated target cleansing may be initiated (step 2g). This may then lead to Post Validation Testing (PVT) (step 2h).

In Phase 2 of Branch migration, the required Metadata and Dictionary may be moved to Target (Onshoring branch). Target Cleansing may be performed to remove Global data. This may ensure that the new branch instance contains the required branch data. Cleansing of Source data in Target may be performed to avoid Global users having access to on-shored Branch instance, etc. According to an exemplary illustration, cleansing in the Target environment may involve the following: INTERCO.PARAIVIETER—remove global data from Target; user table cleansing—remove global data from Target; TSA.SERVICE cleansing—remove Global server name from Target and scripts to update batch for FATCA, Bridger, IDCERT and REGD. An embodiment of the present invention provides a parameter-based configurable way to remove redundant data.

Global Cleansing may be initiated after validation of phase 2. Once the branch is migrated from Global, migrated branch specific data may be cleansed. Cleansing of Branch migrated data from Global may be a mandatory activity to remove unused data. Global cleansing may be performed in user data, in Batch records etc. Once the migration of local instance is successfully completed, the Migration Tool may perform cleansing on the Source. This may include: Automated Source Cleansing and Validation of Source Cleansing.

As shown in FIG. 1, Phase 3 may involve initiating an automated source cleansing process (step 3a) at Source 102. Phase 3 may further involve validation of source cleansing (step 3b) and PVT of source cleansing (step 3c).

Phase 4 may be an optional phase that performs based on a decision to remove all the tables of on-shored branch (e.g., local instance) from a global instance. Phase 4 may delete (e.g., drop/remove) all the on-shored branch tables. As shown in FIG. 1, Phase 4 may involve initiating an automated branch removal (step 4a). Phase 4 may further involve automated validation of branch removal (step 4b) and PVT of branch removal (step 4c).

Figure 2:
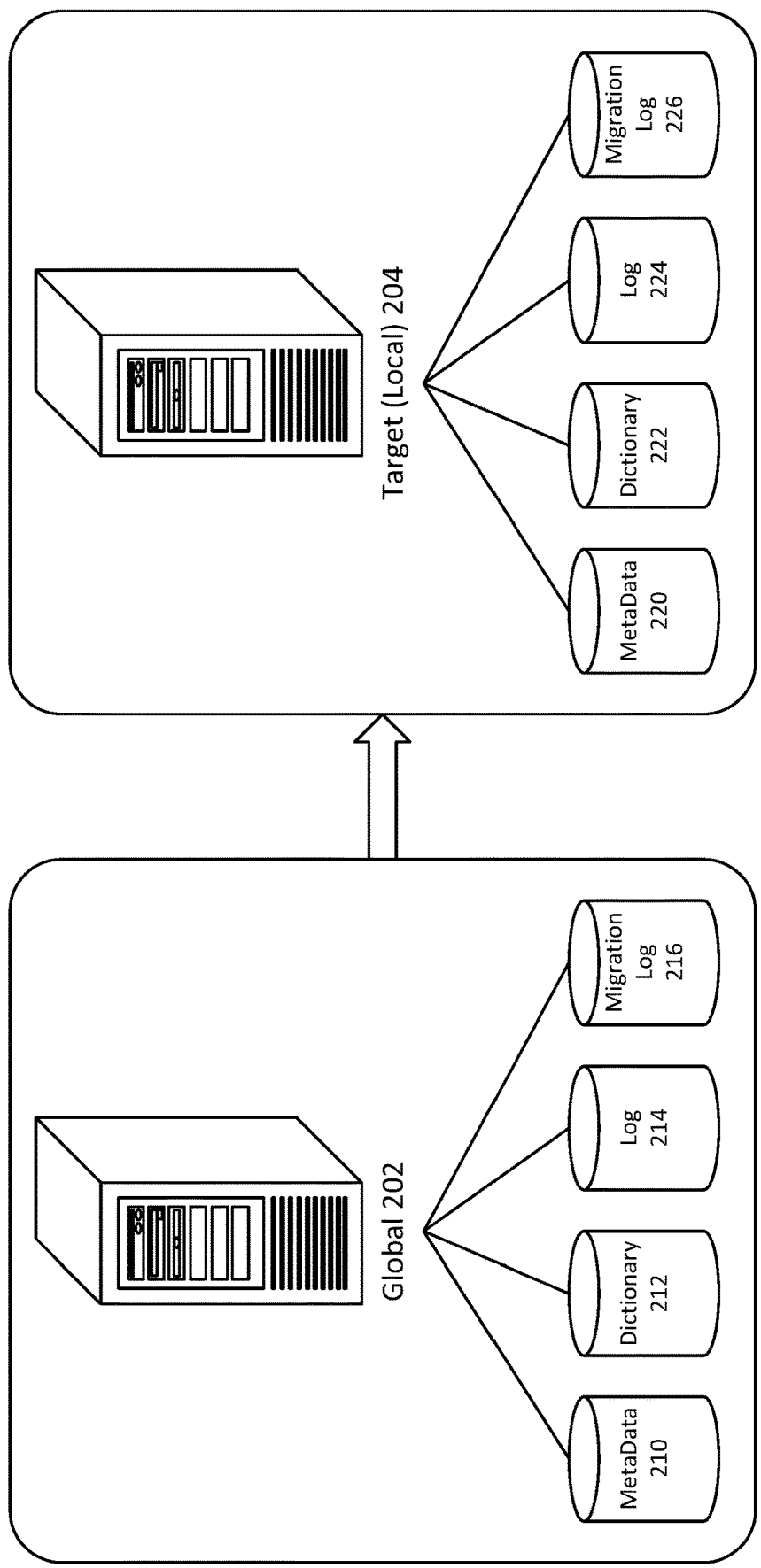
FIG. 2 is an illustration of local migration flows, according to an embodiment of the present invention.

FIG. 2 is an illustration of local migration flows, according to an embodiment of the present invention. As shown in FIG. 2, Global system 202 may migrate branch data to Target (local) system 204. The migration process may occur in phases where Metadata 210, Dictionary Tables 212, Log 214 and Migration Log 216 are respectively migrated to Metadata 220, Dictionary Tables 222, Log 224 and Migration Log 226 of Target system 204. Once the migration process is complete, the migrated data may be removed or deleted from Global 202.

Figure 3:
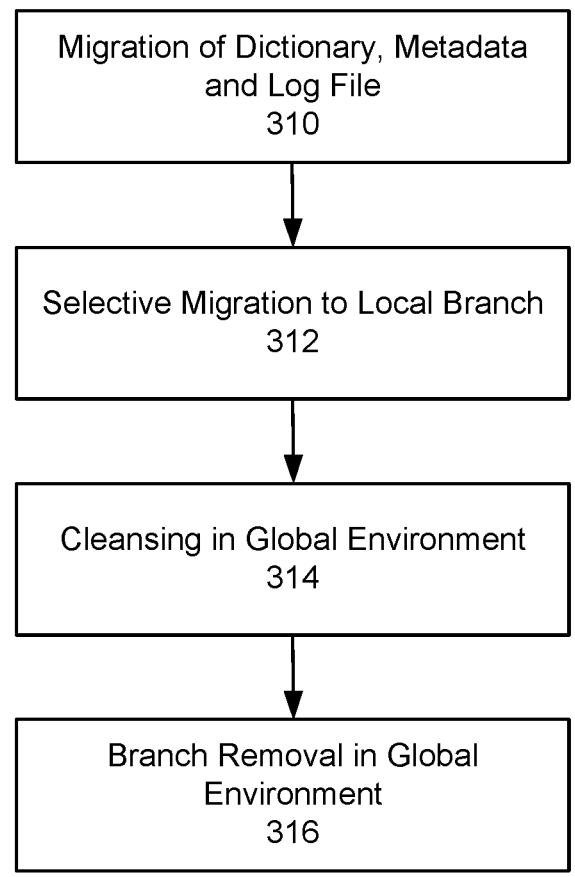
FIG. 3 is an exemplary flow diagram for branch migration, according to an embodiment of the present invention.
Figure 5:
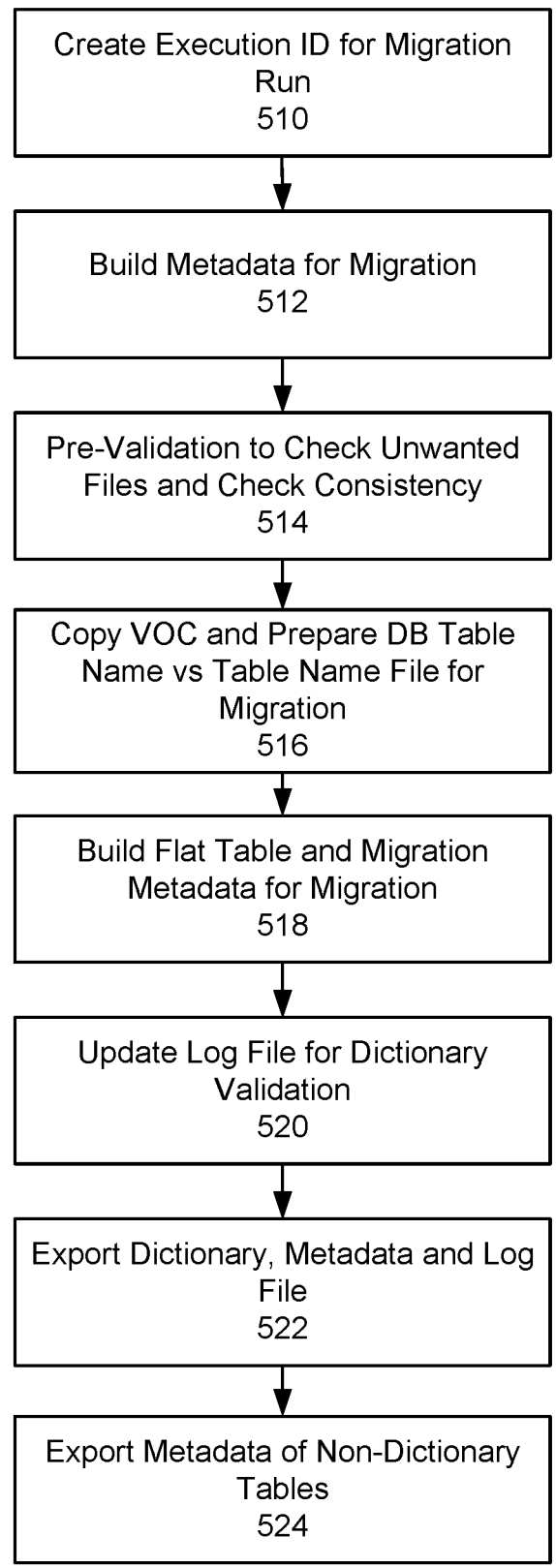
FIG. 5 is an exemplary flow diagram for branch migration, according to an embodiment of the present invention.
Figure 6:
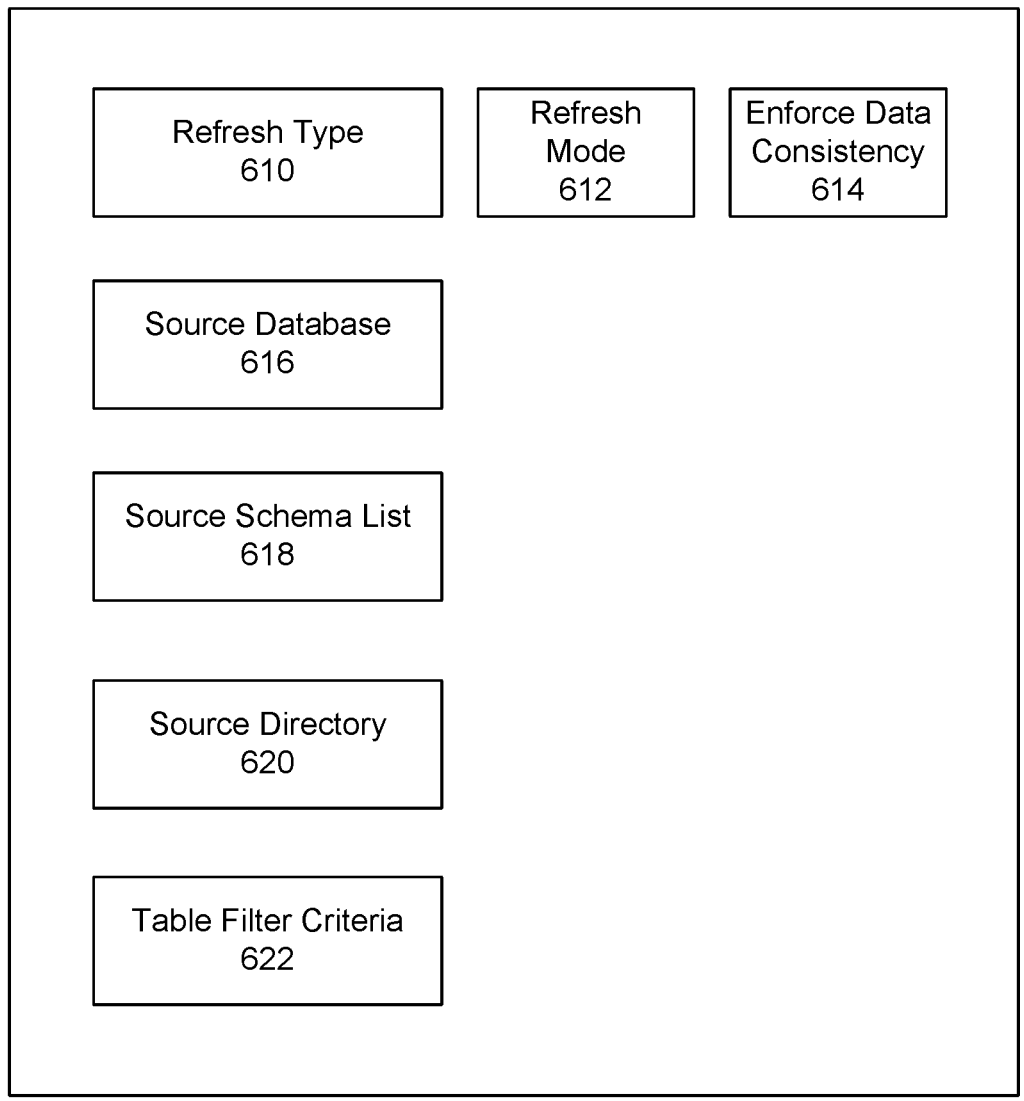
FIG. 6 illustrates an exemplary database portal, according to an embodiment of the present invention.
Figure 7:
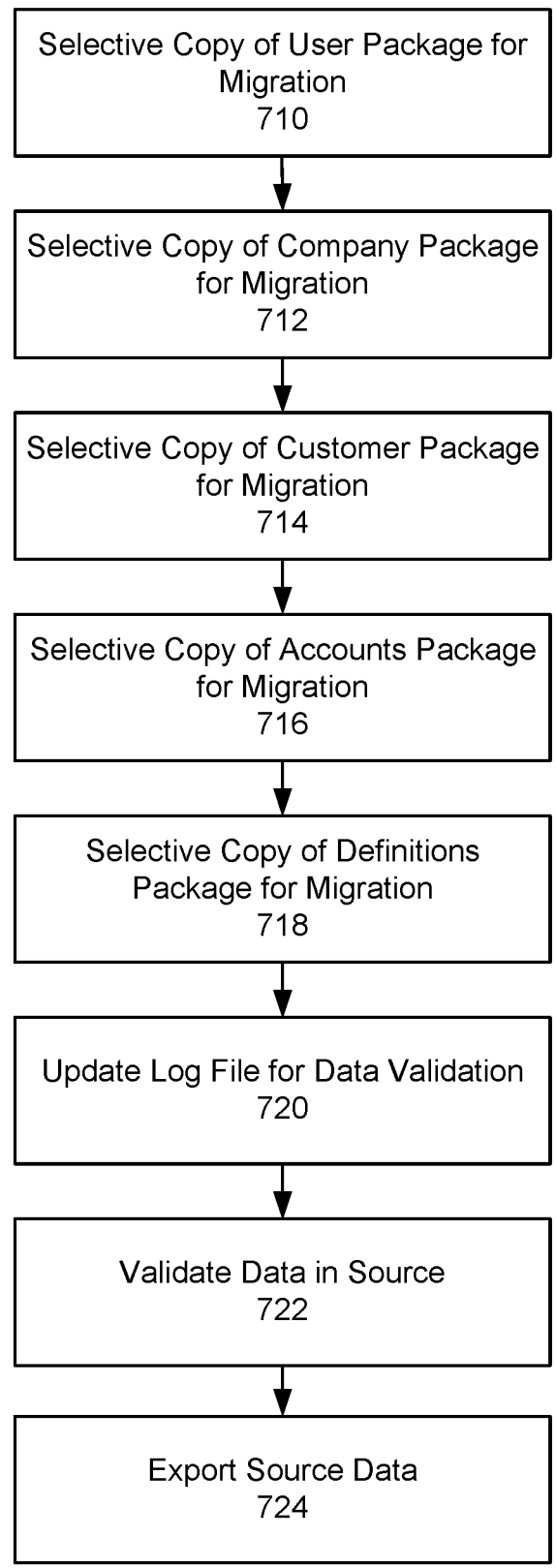
FIG. 7 is an exemplary flow diagram for selective migration, according to an embodiment of the present invention.
Figure 8:
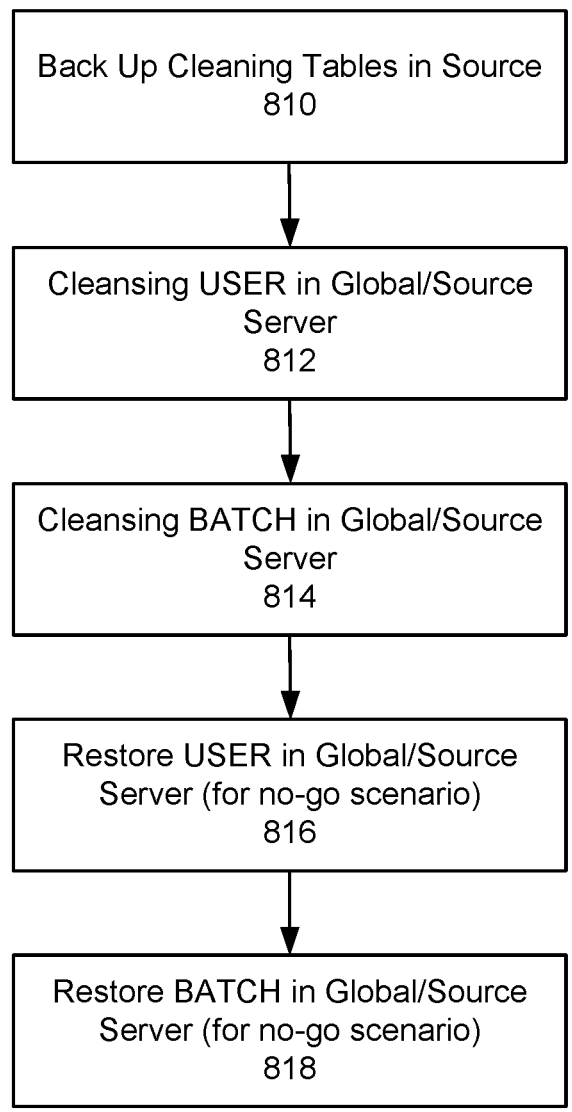
FIG. 8 is an exemplary flow diagram for migration cleansing, according to an embodiment of the present invention.
Figure 9:
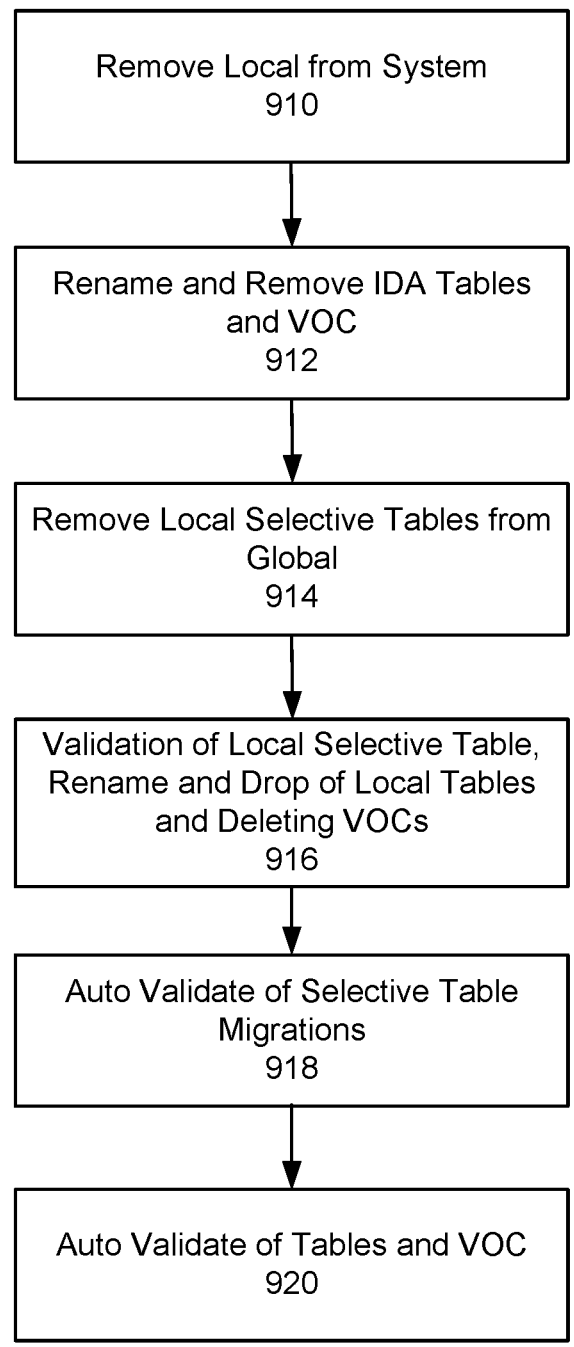
FIG. 9 is an exemplary flow diagram for branch removal, according to an embodiment of the present invention.

FIG. 3 is an exemplary flow diagram for branch migration, according to an embodiment of the present invention. At step 310, dictionary, metadata and log files may be migrated from a global environment to a new local instance. Database objects have various descriptive attributes. Information about a particular schema object may be obtained by performing a DESCRIBE operation. The result may be accessed as an object of a Metadata class by passing object attributes as arguments to the various methods of the Metadata class. Additional details are shown in FIGS. 5 and 6. At step 312, selective migration of local branches from global to new local instance may be followed by cleansing of redundant (e.g., user, parameter, batch, etc.), global data in local instance. Additional details are shown in FIG. 7. At step 314, cleansing in a global environment may be performed. Additional details are shown in FIG. 8. At step 316, branch removal (local) in the global environment may be performed. Additional details are shown in FIG. 9. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
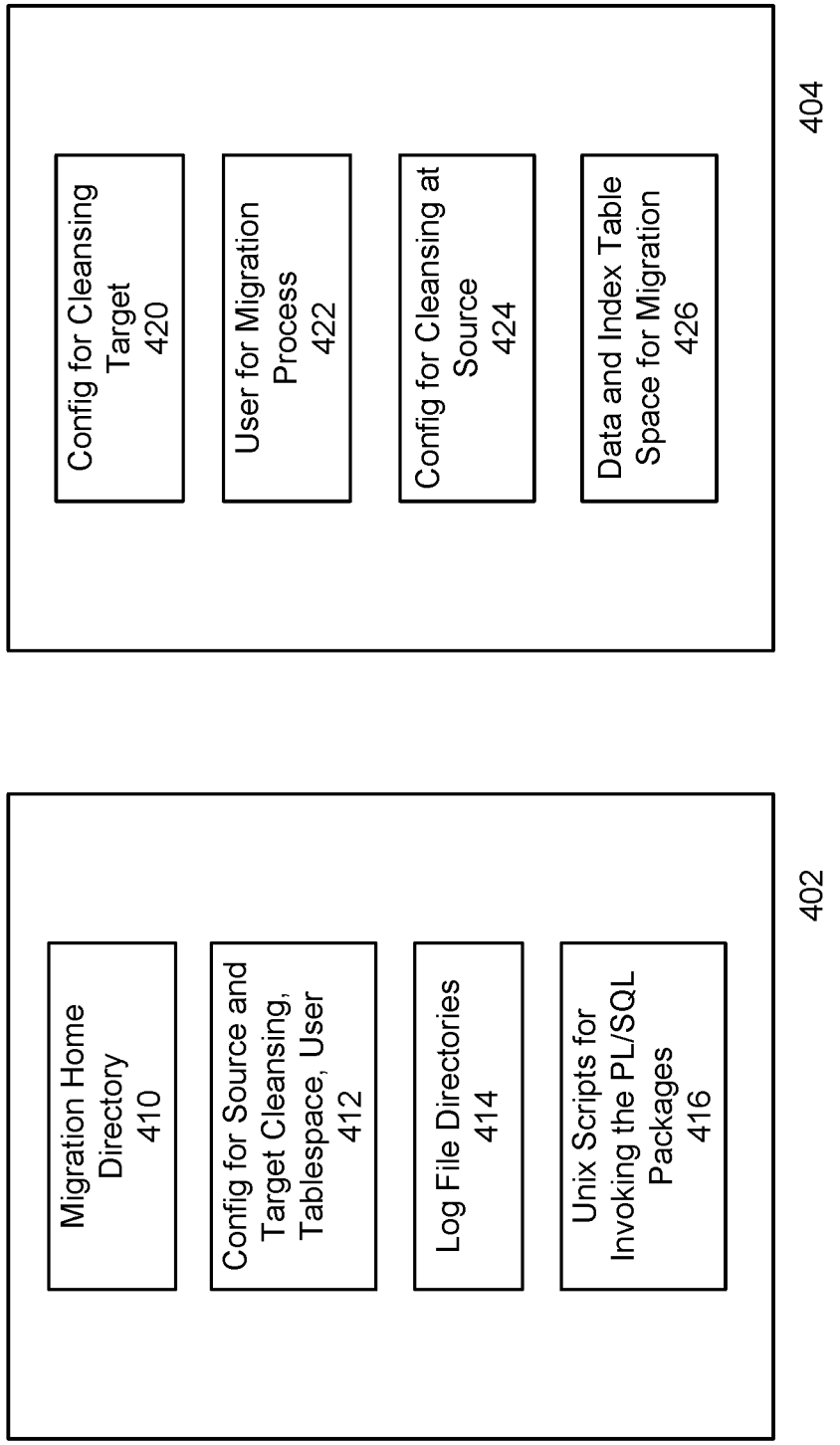
FIG. 4 is an exemplary screenshot, according to an embodiment of the present invention.

FIG. 4 is an exemplary screenshot, according to an embodiment of the present invention. FIG. 4 illustrates a menu driven approach. The interactive interface may be agnostic of the branch, database, and schema. Further, the interface provides repeatable steps and may support easily configurable dependencies.

FIG. 4 illustrates an interface to address pre-requisites, such as scripts and configurations. As shown in FIG. 4, the interface may provide Migration Home Directory 410, Configuration for Source and Target Cleansing, Tablespace, User 412, Log File Directories 414 and Scripts for invoking certain packages 416. Migration Home Directory 410 may include a path name for export. Configuration information at 412 may include configuration data for source, tablespace, target and user. Log File Directories 414 may include log information for archives, spool log and Unix log. Scripts 416 may relate to validation, XML driver log, flat table data build, migrate list, old validation, pre validation, rename, validation script, validation source script, validation target script, etc.

Another interface at 404 may provide Configuration for Cleansing Target 420, User for Migration Process 422, Configuration for Cleansing at Source 424 and Data and Index Table Space for Migration 426. Configuration for Cleansing Target 420 may include target configuration data. Configuration for Cleansing at Source 424 may include source configuration data relating to user, batch, etc. Data and Index Table Space for Migration 426 may identify tables and/or other files/data for migration.

FIG. 5 is an exemplary flow diagram for branch migration, according to an embodiment of the present invention. According to an exemplary scenario, a sequence of steps may be executed. Step 510 may create an execution identifier (ID) for a migration run. For example, an execution ID may represent a unique number for a migration activity. Step 512 may build metadata for migration. Step 514 may perform a pre-validation to check unwanted files and check consistency. Step 516 may copy vocabulary files (VOC) and prepare a database table name versus table name file for migration. Step 518 may build flat table and migration metadata for migration. Step 520 may update log file for dictionary validation. For example, migration log table may be built for the purpose of validating dictionary tables. Step 522 may export dictionary, metadata and log files. Step 524 may export metadata for non-dictionary tables.

Additional steps may include one or more of the following: transferring an exported dump from Source to Target via a database self-service portal; importing Dictionary and Migration log tables in the Target via a database self-service portal; performing an Automated Validation of Dictionary tables import in Target; building a Migration log table for the purpose of validating the Metadata tables in Source; exporting Metadata of Data Tables (excluding Statistics) in Source; transferring the exported dump from Source to Target via a database self-service portal; importing Metadata (excluding Statistics) in Target via a database self-service portal; renaming Metadata of Binary XML non selective tables in Target; and performing Automated Validation of Metadata import in Target.

While the process of FIG. 5 illustrates certain steps performed in a particular order, it should be understood that the embodiments of the present invention may be practiced by adding one or more steps to the processes, omitting steps within the processes and/or altering the order in which one or more steps are performed.

FIG. 6 illustrates an exemplary database portal, according to an embodiment of the present invention. FIG. 6 may represent an exemplary database self-service portal. A user may identify Refresh Type 610, Refresh Mode 612 and Data Consistency 614. A user may further identify Source Database 616, Source Schema List 618, Source Directory 620 and Table Filter Criteria 622. The database portal shown by FIG. 6 may be used to export dictionary, metadata of dictionary and log files as well as export metadata of non-dictionary tables.

Refresh Type 610 may be selected from options such as refresh schema, refresh table, export schema and export table. Refresh Mode 612 may include all, metadata and data. Other options may be available. Data consistency may be enforced at 614. Source Database 616 may be selected by name, identifier and/or other criteria. At Source Schema List 618, a schema name may be entered in a schema mapping input. Source Directory 620 may be selected from a list of available data paths. Table Filter Criteria 622 may enter filters and/or other conditions.

FIG. 7 is an exemplary flow diagram for selective migration, according to an embodiment of the present invention. Selective Migration of data may be performed on tables and/or other subset of data, files, etc. For example, selective migration of the tables may be grouped into packages (e.g., 4 packages, etc.) based on their functionality/domain. This may include: User Package; Company Packages; Customer Packages and Account Packages.

According to an exemplary scenario, a sequence of steps may be executed. Step 710 may perform a selective copy of a user package for migration in a source environment. Step 712 may perform a selective copy of a company package for migration. Step 714 may perform a selective copy of customer package for migration. Step 716 may perform a selective copy of accounts package for migration. Step 718 may perform a copy of definitions package for migration. Step 720 may update log files for data validation in the source environment. Step 722 may validate data in the source environment. Step 724 may export the source data. This may involve exporting data and migrating log tables from the source.

Additional steps may involve importing Dictionary and Migration log tables in the target environment and initiating automated validation of the import of Dictionary tables into the target environment.

While the process of FIG. 7 illustrates certain steps performed in a particular order, it should be understood that the embodiments of the present invention may be practiced by adding one or more steps to the processes, omitting steps within the processes and/or altering the order in which one or more steps are performed.

FIG. 8 is an exemplary flow diagram for migration cleansing, according to an embodiment of the present invention. According to an exemplary scenario, a sequence of steps may be executed. Step 810 may back-up cleaning tables in a source environment. Step 812 may initiate cleansing USER in a global/source server. This may refer to cleansing redundant user data. Step 814 may initiate cleansing BATCH in global/source server. This may involve cleansing redundant batch data and/or end of day processing data. According to an exemplary illustration, this may include cleansing BANK.REGD.HIST, BANK.REGD.BAL and BANK.REGD in a global/source server. Step 816 may restore USER in global/source server. This may be initiated when there is a need to restore user data and/or bring the user data back to business as usual (BAU). This may be for no-go scenarios, such as not being able to go live which would involve having global/source server restore data back to its original state. Step 818 may restore BATCH in a global/source server. This may be initiated when there is a need to restore batch or end of day processing data and/or bring the data back to business as usual (BAU). This may be for no-go scenarios. According to an exemplary illustration, this may include restoring BANK.REGD.HIST, BANK.REGD.BAL and BANK.REGD in a global/source server. Additional steps may involve stopping all AUTO services to run the cleansing and then starting all AUTO services. Additional steps may include running a P.BANK.AD.AUTO.DEPLOY program to deploy data records. While the process of FIG. 8 illustrates certain steps performed in a particular order, it should be understood that the embodiments of the present invention may be practiced by adding one or more steps to the processes, omitting steps within the processes and/or altering the order in which one or more steps are performed.

FIG. 9 is an exemplary flow diagram for branch removal, according to an embodiment of the present invention. According to an exemplary scenario, a sequence of steps may be executed. Step 910 may remove Local from INTER-CO.PARAMETER 'SYSTEM.' Step 912 may rename and remove migrated Tables and VOC (Vocabulary). Step 914 may remove Local Selective tables from a Global environment. Step 916 may perform a validation of Local Selective table, Rename and Drop of Local tables and deleting of VOCs. Step 918 may initiate an auto validate of selective table migrations. Step 820 may initiate an auto validation of Tables and VOC. While the process of FIG. 9 illustrates certain steps performed in a particular order, it should be understood that the embodiments of the present invention may be practiced by adding one or more steps to the processes, omitting steps within the processes and/or altering the order in which one or more steps are performed.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a Branch Migration Tool, the system comprising:
   an interactive interface that receives user input via a communication network; and
   one or more computer processors coupled to more than one memory components and the interactive interface and further programmed to perform the following:
   initiating, by at least one of the one or more computer processors, a migration of dictionary, metadata and log files from at least one of the more than one memory components to at least another one of the more than one memory components,
   wherein the at least one of the more than one memory components is located in a global environment and the at least another one of the more than one memory components is located in a local branch environment,
   wherein the global environment is at least one distributed computer network from among a local area network, a wide area network, a telecommunications network, an intranet and Internet,
wherein the at least one of the one or more computer processors copies vocabulary files and prepares database table names for migration, and
wherein the at least one of the one or more computer processors updates the log files for dictionary validation;
selectively migrating, by the at least one of the one or more computer processors, local branch data from the at least one of the more than one memory components in the global environment to the at least another one of the more than one memory components in the local branch environment,
wherein any one of the one or more computer processors cleanses global data, by removing redundant global data, in the at least another one of the more than one memory components in the local branch environment;
cleansing, by the at least one of the one or more computer processors, source data by removing redundant source data in the at least one of the more than one memory components in the global environment; and
removing, by the at least one of the one or more computer processors, local branch data in the at least one of the more than one memory components in the global environment,
wherein the removing, by the at least one of the one or more computer processors, local branch data in the at least one of the more than one memory components in the global environment, further comprises: renaming and dropping local tables and deleting the vocabulary files associated with the migration.

2. The system of claim 1, wherein the redundant global data comprises user data, parameter data and batch data.

3. The system of claim 1, wherein the computer processor is further programmed to perform the following: automatically generating and transmitting an electronic communication to one or more recipients after each step.

4. The system of claim 1, wherein the computer processor is further programmed to perform the following: performing a pre-validation to check unwanted files and check for consistency of terms.

5. The system of claim 1, wherein selectively migrating local branch data further comprises selectively copying one or more of: a user package, a company package, a customer package.

6. The system of claim 5, wherein selectively migrating local branch data further comprises selectively copying one or more of: an accounts package and a definitions package.

7. The system of claim 1, wherein cleansing source data in the global environment further comprises backing up cleaning tables in the global environment.

8. The system of claim 1, wherein cleansing source data in the global environment further comprises cleansing redundant user data and redundant batch data in the global environment.

9. The system of claim 1, wherein removing local branch data in the global environment further comprises: renaming and removing tables associated with the migration from the vocabulary files.

10. A computer implemented method that implements a Branch Migration Tool via one or more computer processors coupled to more than one memory components, the method comprising the following:
initiating by at least one of the one or more computer processors, a migration of dictionary, metadata and log files from at least one of the more than one memory components to at least another one of the more than one memory components,
wherein the at least one of the more than one memory components is located in a global environment and the at least another of more than one memory components is located in a local branch environment,
wherein the global environment is at least one distributed computer network from among a local area network, a wide area network, a telecommunications network, an intranet and Internet,
wherein the at least one or more computer processors copies vocabulary files and prepares database table names for migration, and
wherein the at least one of the one or more computer processors updates the log files for dictionary validation;
selectively migrating, by the at least one of the one or more computer processors, local branch data from the least one of the more than one memory components in the global environment to the least another one of the more than one memory components in the local branch environment,
wherein any one of the one or more computer processors cleanses global data, by removing redundant global data, in the at least another one of the more than one memory components in the local branch environment;
cleansing, by the at least one of the one or more computer processors, source data by removing redundant source data in the least one of the more than one memory components in the global environment; and
removing, by the at least one of the one or more computer processors, local branch data in the least one of the more than one memory components in the global environment,
wherein the removing, by the at least one of the one or more computer processors, local branch data in the at least one of the more than one memory components in the global environment, further comprises: renaming and dropping local tables and deleting the vocabulary files associated with the migration.

11. The method of claim 10, wherein the redundant global data comprises user data, parameter data and batch data.

12. The method of claim 10, further comprising the following: automatically generating and transmitting an electronic communication to one or more recipients after each step.

13. The method of claim 10, further comprising the following: performing a pre-validation to check unwanted files and check for consistency of terms.

14. The method of claim 10, further comprising the following: selectively copying one or more of: a user package, a company package, a customer package.

15. The method of claim 14, further comprising the following: selectively copying one or more of: an accounts package and a definitions package.

16. The method of claim 10, further comprising the following: backing up cleaning tables in the global environment.

17. The method of claim 10, further comprising the following: cleansing redundant user data and redundant batch data in the global environment.

18. The method of claim 10, further comprising the following: renaming and removing tables associated with the migration from the vocabulary files.

19. The system of claim 1, wherein the at least one of the one or more computer processors updates the log files for dictionary validation by building a migration log table for validating dictionary tables.

20. The method of claim 10, wherein the at least one of the one or more computer processors updates the log files for dictionary validation by building a migration log table for validating dictionary tables.

* * * * *